United States Patent
Raza et al.

(10) Patent No.: US 11,218,981 B2
(45) Date of Patent: Jan. 4, 2022

(54) WIRELESS MESH NETWORK AND DATA TRANSMISSION METHOD

(71) Applicant: Kabushiki Kaisha Toshiba, Minato-ku (JP)

(72) Inventors: Usman Raza, Bristol (GB); Yichao Jin, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 54 days.

(21) Appl. No.: 16/136,993

(22) Filed: Sep. 20, 2018

(65) Prior Publication Data

US 2020/0100196 A1    Mar. 26, 2020

(51) Int. Cl.
*H04W 56/00* (2009.01)
*H04L 12/721* (2013.01)
(Continued)

(52) U.S. Cl.
CPC ....... *H04W 56/001* (2013.01); *H04L 12/1854* (2013.01); *H04L 12/1886* (2013.01);
(Continued)

(58) Field of Classification Search
CPC .......................... H04L 12/1854; H04W 56/001
See application file for complete search history.

(56) References Cited

U.S. PATENT DOCUMENTS 7,032,020 B2 * 4/2006 Gross ................. H04L 41/0896
                                                                370/252
7,590,704 B2 * 9/2009 Yuan ................... H04L 67/2804
                                                                709/217
(Continued)

FOREIGN PATENT DOCUMENTS

CN     103402236 A    11/2013

OTHER PUBLICATIONS

Ferrari, F., et al., "Efficient Network Flooding and Time Synchronization with Glossy", Information Processing in Sensor Networks (IPSN), 2011 10th International Conference on IEEE, 2011,12 pages.

(Continued)

*Primary Examiner* — Parth Patel
(74) *Attorney, Agent, or Firm* — Oblon, McClelland, Maier & Neustadt, L.L.P.

(57) ABSTRACT

A time synchronised network comprising a plurality of nodes, the plurality of nodes each comprising a receiver, a transmitter, a controller and memory storing program instructions. The plurality of nodes are suitable for participating in time synchronised data re-transmission within the network. The plurality of nodes comprise a plurality of source nodes, a plurality of destination nodes and at least one intermediate node. The plurality of source nodes transmitting data concurrently with the other source nodes via the respective transmitter in a first flooding round to a plurality of corresponding destination nodes. The plurality of destination nodes receiving data via the respective receiver from a plurality of corresponding source nodes. The intermediate node receiving, via the respective receiver, data from at least one of the plurality of source nodes, and re-transmitting the received data in the form it was received using the transmitter.

18 Claims, 7 Drawing Sheets

(51) Int. Cl.
*H04L 12/18* (2006.01)
*H04L 12/751* (2013.01)
*H04W 4/06* (2009.01)
*H04W 4/80* (2018.01)

(52) U.S. Cl.
CPC ............ H04L 45/08 (2013.01); H04L 45/124 (2013.01); H04L 45/32 (2013.01); *H04W 4/06* (2013.01); *H04W 4/80* (2018.02)

(56) References Cited

U.S. PATENT DOCUMENTS

| | | | | |
|---|---|---|---|---|
| 7,924,728 B2* | 4/2011 | Riga | ............ | G01D 9/005 370/218 |
| 7,974,227 B1* | 7/2011 | Seay | ............ | H04L 63/102 370/315 |
| 8,095,590 B1* | 1/2012 | Holm | ............ | H04L 12/1863 709/201 |
| 8,984,361 B2* | 3/2015 | Wang | ............ | H04W 84/047 714/748 |
| 9,693,325 B1* | 6/2017 | Park | ............ | H04W 56/0005 |
| 9,998,406 B2* | 6/2018 | Haeupler | ............ | H04L 49/90 |
| 10,341,935 B2* | 7/2019 | Khalife | ............ | H04W 8/005 |
| 10,485,080 B1* | 11/2019 | Lydecker | ............ | H05B 47/19 |
| 2001/0017712 A1* | 8/2001 | Kasatani | ............ | H04N 1/00233 358/1.15 |
| 2006/0053200 A1* | 3/2006 | McCown | ............ | H04L 67/2842 709/206 |
| 2006/0056338 A1* | 3/2006 | Abe | ............ | H04B 7/026 370/328 |
| 2008/0144643 A1* | 6/2008 | Berg | ............ | H04W 72/0453 370/401 |
| 2008/0250293 A1* | 10/2008 | Taori | ............ | H04B 7/155 714/748 |
| 2009/0290650 A1* | 11/2009 | Zyren | ............ | G06Q 50/06 375/257 |
| 2010/0167743 A1* | 7/2010 | Palanki | ............ | H04W 72/02 455/436 |
| 2011/0019695 A1* | 1/2011 | Wu | ............ | H04W 28/06 370/477 |
| 2011/0032864 A1* | 2/2011 | Lee | ............ | H04W 72/1257 370/315 |
| 2011/0122878 A1* | 5/2011 | Li | ............ | H04L 45/026 370/400 |
| 2011/0179423 A1* | 7/2011 | Lesartre | ............ | G06F 15/173 718/104 |
| 2011/0213278 A1* | 9/2011 | Horak | ............ | A61B 5/112 600/595 |
| 2011/0214030 A1* | 9/2011 | Greenberg | ............ | A61B 5/002 714/748 |
| 2011/0268139 A1* | 11/2011 | Caracas | ............ | H04J 3/0652 370/503 |
| 2012/0008542 A1* | 1/2012 | Koleszar | ............ | H04L 45/32 370/312 |
| 2012/0300632 A1* | 11/2012 | Li | ............ | H04W 40/244 370/235 |
| 2013/0301633 A1* | 11/2013 | Brown | ............ | H04J 3/0647 370/350 |
| 2014/0010138 A1* | 1/2014 | Flammer, III | ............ | H04W 4/06 370/312 |
| 2014/0293787 A1* | 10/2014 | Bourdelles | ............ | H04W 40/02 370/235 |
| 2014/0355513 A1* | 12/2014 | Shin | ............ | H04J 11/0023 370/315 |
| 2014/0380133 A1* | 12/2014 | Kim | ............ | H04L 1/0041 714/776 |
| 2015/0055498 A1* | 2/2015 | Sulc | ............ | H04W 24/08 370/252 |
| 2015/0085852 A1* | 3/2015 | Mizutani | ............ | H04L 43/0858 370/350 |
| 2015/0124642 A1* | 5/2015 | Pani | ............ | G06F 3/04842 370/254 |
| 2015/0319001 A1* | 11/2015 | Kojima | ............ | H04W 28/04 370/254 |
| 2015/0341874 A1* | 11/2015 | Nguyen-Dang | .. | H04W 52/0209 370/350 |
| 2016/0119739 A1* | 4/2016 | Hampel | ............ | H04W 4/70 370/315 |
| 2016/0337992 A1* | 11/2016 | Sheu | ............ | H04W 56/001 |
| 2017/0019223 A1* | 1/2017 | Mawlawi | ............ | H04B 7/2621 |
| 2017/0099567 A1* | 4/2017 | Kwon | ............ | H04W 40/023 |
| 2017/0164264 A1* | 6/2017 | Kato | ............ | H04W 28/14 |
| 2017/0244576 A1* | 8/2017 | Batra | ............ | H04W 56/0025 |
| 2017/0331636 A1* | 11/2017 | Osagawa | ............ | H04W 28/04 |
| 2017/0353933 A1* | 12/2017 | Xhafa | ............ | H04W 76/25 |
| 2018/0092115 A1* | 3/2018 | Krasnyanskiy | ....... | H04L 5/0055 |
| 2018/0131617 A1* | 5/2018 | Hira | ............ | H04L 49/70 |
| 2018/0146478 A1* | 5/2018 | Kim | ............ | H04W 76/14 |
| 2018/0279091 A1* | 9/2018 | Boesen | ............ | H04W 4/12 |
| 2018/0332434 A1* | 11/2018 | Kulkarni | ............ | H04L 67/22 |
| 2018/0343200 A1* | 11/2018 | Jana | ............ | H04L 45/02 |
| 2019/0014592 A1* | 1/2019 | Hampel | ............ | H04W 56/001 |
| 2019/0045574 A1* | 2/2019 | Feng | ............ | H04B 7/155 |
| 2019/0149957 A1* | 5/2019 | Raza | ............ | H04W 40/023 370/312 |
| 2019/0306080 A1* | 10/2019 | Gaonkar | ............ | H04L 47/805 |
| 2019/0312810 A1* | 10/2019 | Strom | ............ | H04L 67/104 |
| 2019/0373608 A1* | 12/2019 | Weiss | ............ | H04L 1/0076 |
| 2019/0394676 A1* | 12/2019 | Gardner | ............ | H04L 47/50 |
| 2020/0053802 A1* | 2/2020 | Li | ............ | H04L 41/5077 |
| 2020/0288420 A1* | 9/2020 | Zhu | ............ | H04W 56/0015 |
| 2021/0111999 A1* | 4/2021 | Gandhi | ............ | H04L 43/0858 |

OTHER PUBLICATIONS

Landsiedel, O., et al., "Chaos: Versatile and Efficient All-to-All Data Sharing and In-Network Processing at Scale", Proceedings of the 11th ACM Conference on Embedded Networked Sensor Systems, ACM, 2013, 14 pages.

Istomin, T., et al., "Data Prediction + Synchronous Transmissions = Ultra-low Power Wireless Sensor Networks", Proceedings of the 14th ACM Conference on Embedded Network Sensor Systems CDROM, ACM, 2016, 13 pages.

Raza, U., et al., "Competition: Synchronous Transmissions based Flooding for Dependable Internet of Things", The proceedings of International Conference on Embedded Wireless Networked Systems, Uppsala, Sweden, ResearchGate, https://www.researchgate.net/publication/317021902, Conference Paper—Feb. 2017, 3 pages.

* cited by examiner

WIRELESS MESH NETWORK AND DATA TRANSMISSION METHOD

FIELD

Embodiments described herein relate generally to wireless mesh networks and to associated data transmission methods. More specifically embodiments relate to a flooding technique for use in such networks.

BACKGROUND

Industrial control applications often pose very stringent requirements on latency and reliability. This is also a reason why wired solutions are more popular despite their much higher cost than wireless technologies. The industry does see clear cost benefits in moving from wired technologies to more flexible, low maintenance, and easily deployable wireless technologies. Nevertheless, operation of wireless solutions in the shared Industrial, Scientific, and Medical (ISM) radio bands attracts scepticism due to a number of factors such as high levels of interference in these bands. In addition to the inherent unreliability of wireless channels, most wireless solutions for mesh networking are designed for converge-cast traffic originating from multiple nodes and destined to a single central node (also known as the sink).

If it is desired to design a wireless control solution for a Wireless Sensor and Actuator Network (WSAN), the data is first required to be collected from all the sensors to a central node (often referred to as controller), which then disseminates the decisions taken based on the received packets to a set of actuators for them to perform their appropriate action. So, effectively, a closed-loop control required distinct phases, namely sensors-to-controller communication phase and controller-to-actuators communication phase. As these phases are placed one after the other in time, longer end-to-end delay is incurred in closing the control-loop, effectively resulting in more delay and thus missed time-critical deadlines. This renders even the successfully delivered packets useless for doing the control.

The Factories of Future (FoF) and other advanced automation applications will have more stringent latency requirements as well as more complex patterns of communication between sensors, controllers and actuators.

BRIEF DESCRIPTION OF THE DRAWINGS

In the following, embodiments will be described with reference to the drawings in which.

DETAILED DESCRIPTION

Figure 1:
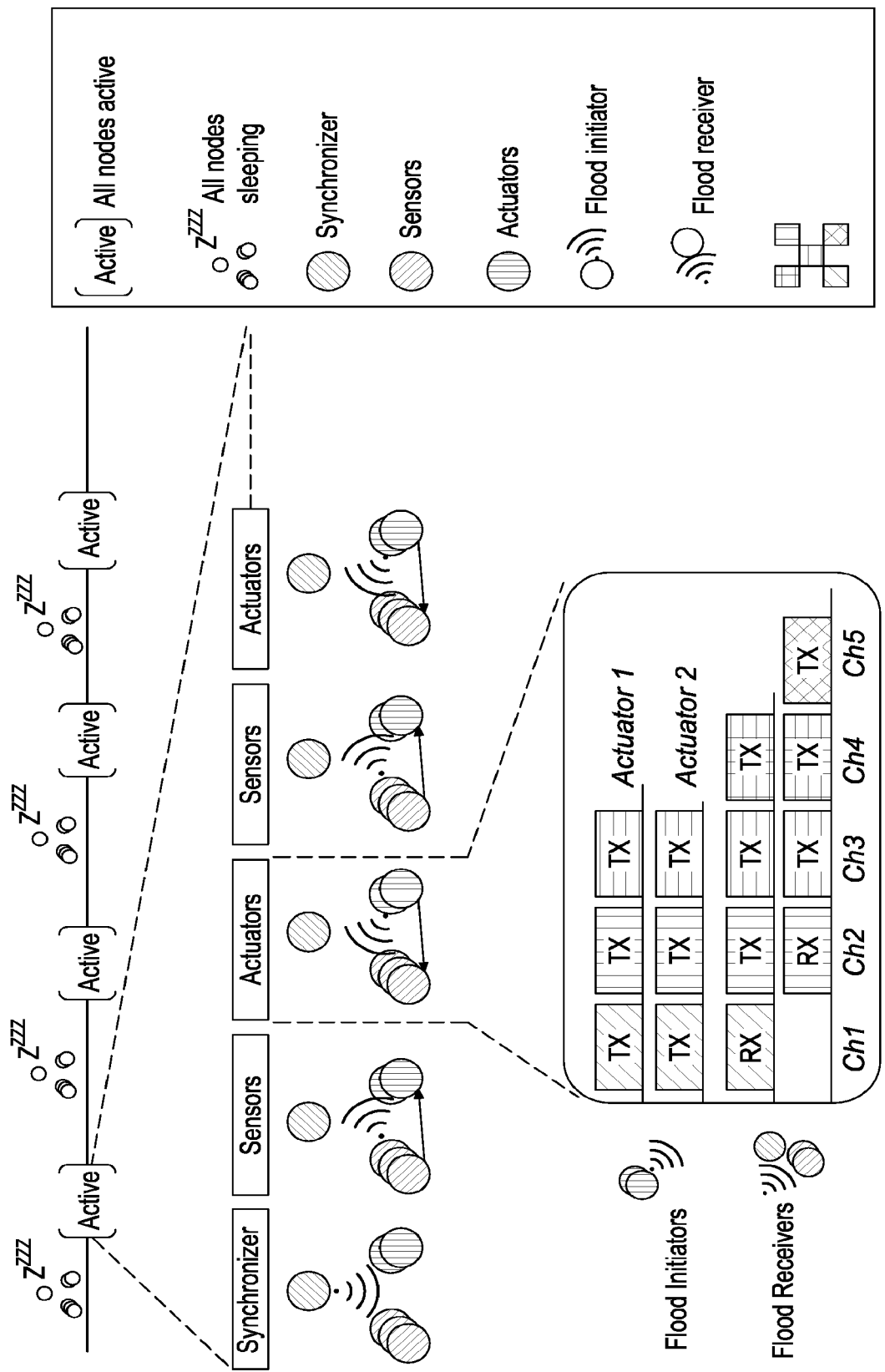
FIG. 1 illustrates a duty cycled operation of a protocol for a wireless frame network according to an embodiment.

In an embodiment there is provided a time synchronised network comprising a plurality of nodes. The plurality of nodes each comprise a receiver, a transmitter, a controller and memory storing program instructions. The plurality of nodes are suitable for participating in time synchronised data re-transmission within the network. The plurality of nodes comprise a plurality of source nodes, a plurality of destination nodes and at least one intermediate node. The respective program instructions of each of the plurality of source nodes causing the respective controller, when executed by the respective controller, to transmit data concurrently with the other source nodes via the respective transmitter in a first flooding round to a plurality of corresponding destination nodes. The respective program instructions of the plurality of destination nodes causing the respective controller, when executed by the respective controller, to receive data via the respective receiver from a plurality of corresponding source nodes. The respective program instructions of the intermediate node causing the respective controller, when executed by the respective controller, to receive, via the respective receiver, data from at least one of the plurality of source nodes, and re-transmit the received data in the form it was received using the respective transmitter.

In an embodiment, the respective program instructions of the plurality of destination nodes further causing the respective controller, when executed by the respective controller, to transmit a signal concurrently with other destination nodes in a second flooding round when data has been received from the corresponding source node, the signal indicating that the data from the corresponding source node has been received successfully.

In an embodiment, the respective program instructions of the plurality of source nodes further causing the respective controller, when executed by the respective controller, to transmit the data on a single channel or on a plurality of channels.

In an embodiment, the plurality of nodes comprises a synchronizer node, the respective program instructions of the synchronizer node causing the respective controller, when executed by the respective controller, to flood the network in a synchronization flooding round such that the plurality of nodes are time synchronized.

In an embodiment, the respective program instructions of the plurality of source nodes further causing the respective controller, when executed by the respective controller, to determine if data is to be transmitted based upon whether data has been produced at the source node and to transmit the data in the first flooding round concurrently with the other source nodes which have produced data.

In an embodiment, the at least one corresponding destination node is located a distance away from the at least one corresponding source node such that data from the corresponding source node is received by the corresponding destination node before other data from another source node interferes with data from the corresponding source node.

In an embodiment, the respective program instructions of at least one of the plurality of destination nodes further causing the respective controller, when executed by the respective controller, to process data which has the strongest signal when received.

In an embodiment, the respective program instructions of the plurality of source nodes further causing the respective controller, when executed by the respective controller, to repeat the first flooding round at least once; and the respective program instructions of the plurality of destination nodes further causing the respective controller, when executed by the respective controller, to repeat the second flooding round at least once.

In an embodiment, the signal includes at least one of the received data in the form it was received, an identification of the destination node and an identification of the corresponding source node which sent the data.

In an embodiment, the respective program instructions of the plurality of source nodes further causing the respective controller, when executed by the respective controller, to: receive the signal from the corresponding destination node, determine that the signal has been received by the corresponding destination node and cease transmission of data.

In an embodiment, the respective program instructions of at least one destination node further causing the respective controller, when executed by the respective controller, to: receive the signal from another of the plurality of destination nodes indicating that data has been successfully received, receive data from the corresponding source node of the destination node, and transmit a further signal indicating that data intended for the destination node has been successfully received and the information that data has been successfully received by the other destination node.

In an embodiment, the intermediate node is at least one of a source node which produces data, a destination node which consumes data and a relay node which does not produce or consume data.

In an embodiment, the respective program instructions of the synchronizer node further causing the respective controller, when executed by the respective controller, to: include information regarding successful transmission between source nodes and their corresponding destination nodes in the synchronization flooding round.

In an embodiment, within each flooding round, there are time slots for transmission; the respective program instructions of the at least one intermediate node further causing the respective controller, when executed by the respective controller, to: receive data to be re-transmitted, determine if the node already has data to be transmitted, select an earlier transmission slot if the node already has data to be transmitted, and transmit received data and data the node already has at the earlier transmission slot.

In an embodiment, the respective program instructions of the at least one intermediate node further causing the respective controller, when executed by the respective controller, to: select a number of waiting slots $S_{piggyback}$ from the interval $[0, S\_MAX_{piggyback}]$ to determine the transmission slot when data is received and the node already has data to transmit, and select a number of waiting slots $S_{relay}$ from the interval $[S\_MAX_{piggyback}+1, S\_MAX_{relay}]$ to determine the transmission slot when data is received and the node does not already have data to transmit.

In an embodiment, the respective program instructions of the intermediate node further causing the respective controller, when executed by the respective controller, to: determine a number of waiting slots $S\_NEW_{piggyback}$ from the interval $[0, S\_MAX_{piggyback}]$ when further data is received, and schedule an updated transmission slot as the earlier of the transmission slot and the current time slot+ the waiting slot $S\_NEW_{piggyback}+1$.

In an embodiment, the network is a wireless sensor and/or actuator network or a cyber physical system.

In an embodiment, there is provided a node comprising a receiver, a transmitter, a controller and memory storing program instructions. The node is suitable for participating in time synchronised data re-transmission within a network having a plurality of nodes. The program instructions causing the controller, when executed by the controller, to: receive, via said receiver data from a plurality of source nodes in the network, transmit data concurrently with at least one of the plurality of source nodes via the respective transmitter in a first flooding round to a plurality of destination nodes in the network, and re-transmit the received data in the form it was received using the transmitter.

In an embodiment, there is provided a method of data transmission using flooding in a network of autonomous time synchronised nodes comprising a plurality of source nodes, a plurality of destination nodes and at least one intermediate node. The method comprising transmitting data concurrently in a first flooding round from the plurality of source nodes to corresponding destination nodes, receiving data at the plurality of destination nodes from the corresponding source nodes, receiving data at the at least one intermediate node from at least one of the plurality of source nodes; and re-transmitting the received data at the at least one intermediate node in the form it was received.

In an embodiment, there is provided a method of data transmission using flooding in a network of autonomous time synchronised nodes comprising, within a node receiving data from a plurality of source nodes in the network, transmitting data concurrently in a first flooding round from the plurality of source nodes to a plurality of destination nodes in the network and re-transmitting the received data in the form it was received.

In an embodiment, there is provided a non-transitory storage medium comprising computer program instructions, the computer program instructions, when executed by a processor, configured to cause the processor to perform the method described above.

Embodiments described herein exploit the spatial diversity, capture effect, and spatially-separated multi-hop paths between source-destination pairs to enable robust, fast, and energy efficient many-to-many communication between sensors and actuators. Embodiments disclosed herein can be adapted by configuring its parameters to balance the trade-offs between latency, reliability, and energy consumption.

Embodiments described herein bypass the central controller between sensor-to-actuator and actuator-to-sensor communication in a multi-hop mesh network to reduce latency. At the same time, direct communication between multiple sensors and actuators achieves much lower latency in various cases. For example, if the controller is relatively far from any of the mutually communicating sensors and actuators, then direct communication is faster. That is, there may be spatial proximity between source-destination pairs relative to sensor-controller pairs and controller pairs. Typically sensors are deployed to monitor a local area. Any observation by the sensors, which require an action, is often carried out by the actuator in the same or nearby area. If controller is deployed farther away, direct sensor-to-actuator communication can provide lower latency. An example to illustrate this is a fire safety home automation system, in which fire can be detected in a kitchen by smoke sensors and only the sprinklers deployed there are needed to be activated without involving the gateway node deployed farther away in other part of the house.

Embodiments allow multiple data sources (source nodes) to transmit data concurrently to multiple destinations (destination nodes). Embodiments allow data to be delivered in its original form without any losses from sources to destinations.

Embodiments described herein enable low-latency communication by enabling sensors to flood their distinct data packets to reach actuators exactly at the same time over a shared channel. Low latency in the order of (tens of) milliseconds and high reliability of 99.999% and above may be achieved.

Embodiments of the synchronous transmissions based network stack for many-to-many communication exploit capture effect, destination diversity and aggressive channel-hopping scheme (within flooding primitives) to deliver an unpredictable volume of traffic from sensors to multiple actuators. This achieves low latency communication by sending data over multiple redundant data paths at the same time on a single channel and many-to-many communication between multiple sensors and multiple actuators.

Structural features of the embodiments include:

a) Actuators act as the controller: The sensors and actuators communicate directly over a multi-hop network without the need to go through a dedicated and central node such as a network-wide controller so to achieve minimal end-to-end delay.

b) Multiple Receptions per Flooding Round: Thanks to the path diversity, presence of multiple destinations, and the way nodes transmit their data packets, embodiments can enable multiple successful receptions between multiple pairs of sensors and actuators that want to communicate in either direction.

c) Dissemination of Successful Receptions between Sensors and Actuators: Embodiments include a protocol that enables nodes to disseminate information about successful communications between pairs of sensors and actuators. This information is used to decide which nodes should access the medium to send their data.

d) Adaptive and reactive mechanism: A mechanism to deliver multiple different packets from multiple senders to multiple receivers without proactive prioritizing or scheduling. Embodiments do not require sophisticated planning or scheduling stage for transmitting data packets from different source nodes. It is possible to deliver the same data packet or multiple different data packets to multiple receivers in the same flooding round.

e) A Differentiated Forwarding Scheme: Embodiments adopt a forwarding strategy that prioritizes the transmissions from the nodes that do have new or more data to transmit in the network.

In embodiments described herein the sensors may report changes to one or multiple actuators. Moreover, actuators also may require the sensed values from multiple sensors to perform their required actions. This means that the protocol may support many-to-many communication, ideally allowing multiple sensors to communicate to the actuators at the same time (i.e., in parallel) so as to keep latency very low. Embodiments may support multiple parallel communication paths between a plurality of sensors and a plurality of actuators.

The sensors may generate data randomly for actuators at any time depending upon the physical quantity to be sensed and when their values mandate certain action. This data is then relayed through the set of relay nodes to reach the actuators. Neither the timing nor the frequency of the data packets is known a priori. The unpredictability of data generation poses extra challenges to the protocol design. For example, if a protocol assigns dedicated radio resources to individual sensors/actuators that end up generating useful data only rarely, then many resources would be wasted, resulting in high energy consumption and latency. More flexible protocols that allow the nodes to share the radio resources among themselves and access them only when needed are much desired in this case. The protocol may be able to cope with multiple data flows between sensors and actuators with a variable amount of traffic.

Embodiments describe a full network protocol stack that supports robust and interference-resilient many-to-many communication of unpredictable volumes of traffic between sensors and actuators. There are multiple data sources (which may be referred to as sensors) and multiple destinations (which may be referred to as actuators) that require data from the former. The other nodes of the network that do not produce or consume the data are called relay nodes and are only used to forward traffic (i.e. data) of other nodes.

Low Power Operation through Duty Cycling:

FIG. 1 shows the duty-cycled operation of an embodiment of a protocol. All network nodes turn on their transceivers periodically in the Active phase only. In embodiments in between any two consecutive Active phases, all the network nodes are either be a sleep or busy doing something else outside the scope of the protocol. For main powered devices, active phases can appear, in some embodiments, in a back-to-back fashion with minimal or no sleep interval in between them. Such an approach may significantly reduce the latency of the protocol at the expense of battery consumption.

Active Phase

Figure 2:
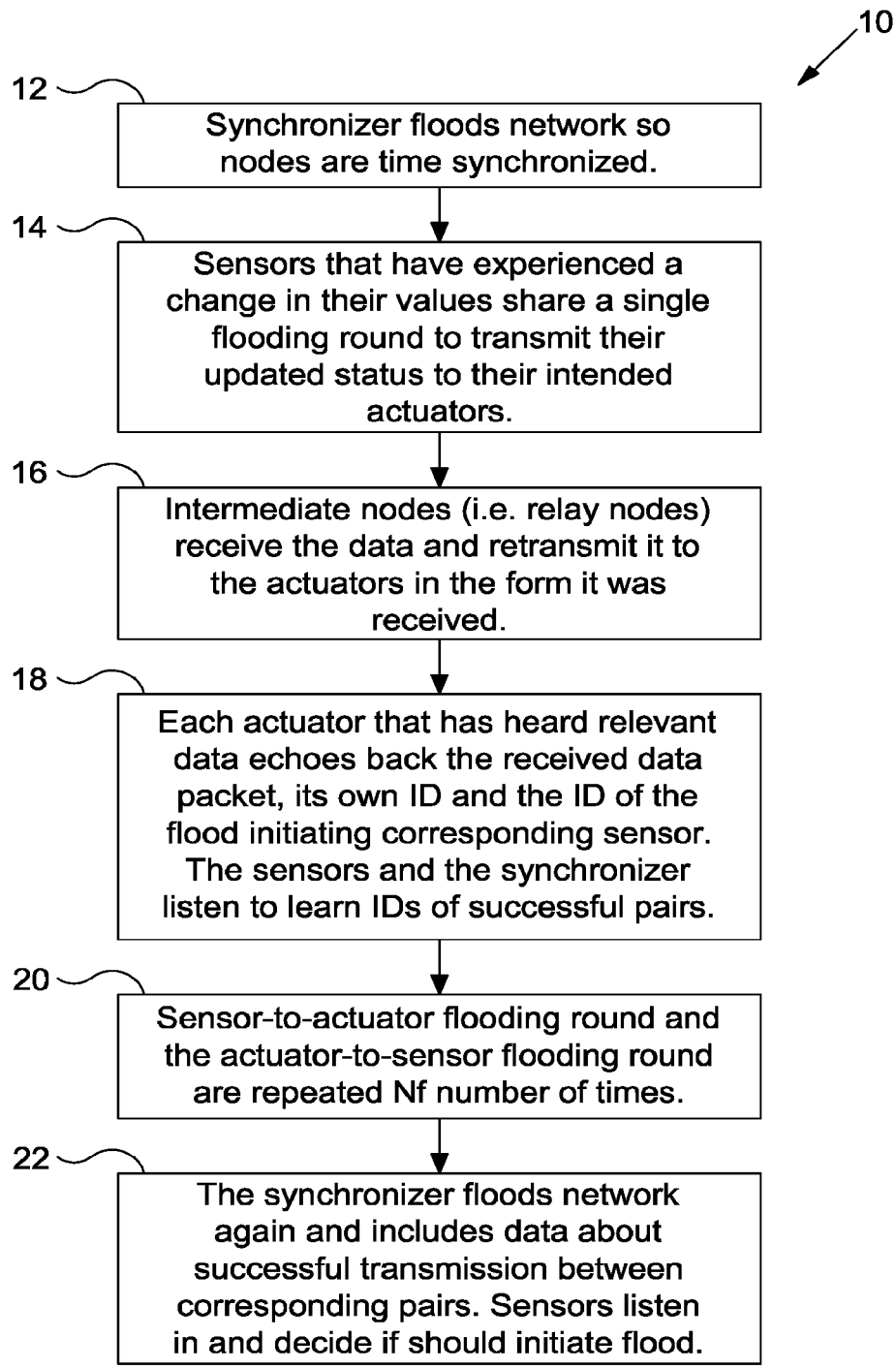
FIG. 2 is a flow diagram of a data transmission method of an embodiment.

An active phase is divided into multiple flooding rounds, each trying to achieve different objectives. FIG. 2 shows a method 10 of an embodiment. There are multiple different stages (e.g. stage a-e) involved in an embodiment of the communication protocol:

a) Time Synchronization: First, in step 12 of the method 10, a dedicated node in the network, referred to as Synchronizer (or a synchronizer node), floods the network so that the nodes can synchronize themselves based on the timestamp of the receptions of the flooded data packets and information contained in these data packets. In other words, the network is flooded in a synchronization flooding round such that the nodes in the network are time synchronized. In other embodiments, the Synchronizer may be one of the source nodes, destination nodes or relay nodes. In some embodiments, the Synchronizer can be a dedicated node as well as one of the source nodes/destination nodes/relay nodes.

b) Sensors to Actuators Communication: After a network-wide synchronization is achieved in step 12, all the sensors (source nodes) that have experienced some changes in their values (e.g. an attribute they are sensing has changed), share a single flooding round (a first flooding round) to transmit their updated status to their intended (corresponding) actuators (destination nodes) in step 14. In other words, the sensors share a single flooding slot only if they have data to transmit. This means that the protocol can cope with a variable amount of data. This contrasts with a Time-division multiple access (TDMA) based schedule where each source has a dedicated slot. For variable amount of data, many of these dedicated slots might be wasted, causing energy drain. By sharing slots, this embodiment uses the time more efficiently.

The Synchronizer initiates the first flood periodically with a time period that can be either kept fixed or changed by the Synchronizer by sending this information in the synchronization flood (the first flood). A plurality of source nodes (sensors) may act as initiators to inject their own distinct data packets, while the relay nodes and the destination nodes act as receivers. In this embodiment, a plurality of destination nodes (actuators) are present. If some of the actuators are physically close to the flood initiating sensors, they can hear the flooded data packet even before the multiple data packets generated by different flood initiating sensors start interfering with each other.

Figure 3:
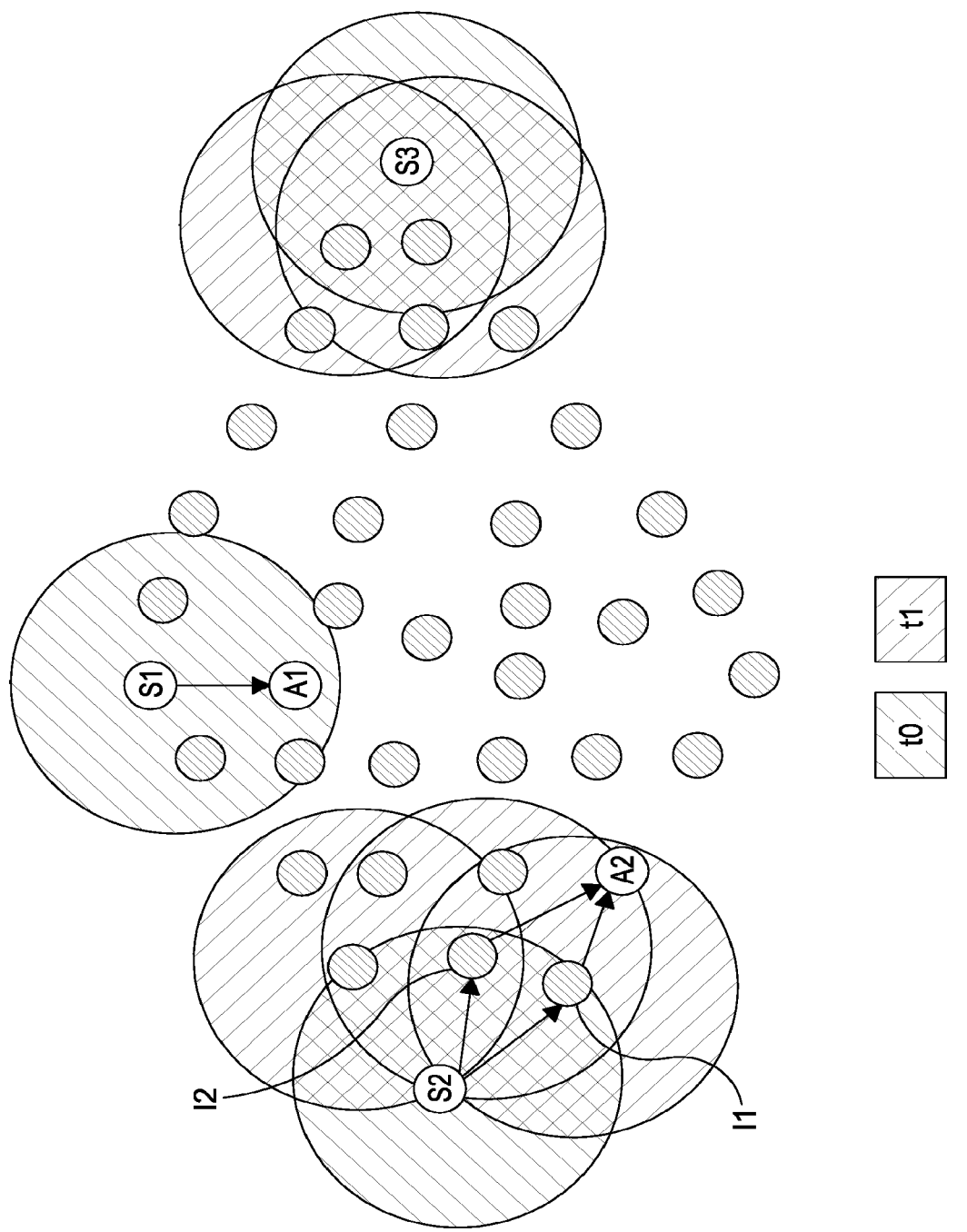
FIG. 3 provides a representation of sensor to actuator communication according to an embodiment.

FIG. 3 shows sensors S1, S2 and S3 communicating with actuators A1, A2, i.e. S1 to A1, S2 to A2 and S3 to A1 & A2. Not all transmissions are shown for clarity and t0 and t1 refers to two consecutive time slots, each wide enough to send one data packet. Successful communication from S3 to A1 & A2 is not shown as it occurs or may occur after t1. At this point, both S1 and S2 do not participate as these have been acknowledged. In a single flooding round, multiple successful data receptions have happened (i.e., between S1-A1 and S2-A2) due to spatial proximity between the corresponding sensor actuator pairs and destination diversity. The communication from sensor S2 to actuator A2 is transmitted through two separate paths which include intermediate nodes I1 and I2 respectively. Each intermediate node, which in this embodiment are relay nodes, receives the data packet from sensor S2 and re-transmits the data packet in the form it was received to the actuator A2 as described in step 16. That is, the re-transmitted data packet is the same as that originally sent by the sensor S2 and data is not lost by merging it with other data. This may lead to a reduction in processing time when compared to merging the data with other data at the node.

The communication from sensor S2 to actuator A2 also may benefit from constructive interference as well. Even when a wave of flooded data packets initiated by one sensing node comes in contact with other waves of flooded data packets initiated by other sensing nodes, the receiving nodes can benefit from the capture effect. This is due to the previous flooding round (synchronization flooding round) initiated by synchronizer that helped sensors to transmit their data packets over the air very precisely in time. The capture effect is the processing (i.e. demodulation) by the node of only the strongest signal that is received by the node. That is, the node locks onto the strongest signal received and only decodes the data packet with the strongest signal. Due to the capture effect, the stronger signal would have been received by the actuators. If signals are from the same source (e.g. coming from different multi-hop paths) they may constructively interfere as long as these arrive in sync at the receiver. In case these are not in sync, or the contents of signals are different (i.e., different sources), then capture effect is relied on. In this case, it is desired that the stronger signal is sufficiently stronger than the weaker signal to be successfully decodable/receivable. In this embodiment, a plurality of sensors may transmit to a plurality of actuators.

c) Actuators to Sensors and Synchronizer Communication: In step 18, there is another flooding round (a second flooding round), where each actuator that has heard relevant data from a sensor (i.e. data intended for the actuator) will echo back the received data packet including its own ID and that of the flood initiating sensor. In other words, the actuators share a single flooding slot only if they have data to transmit. This means that the protocol can cope with a variable amount of data.

Figure 4:
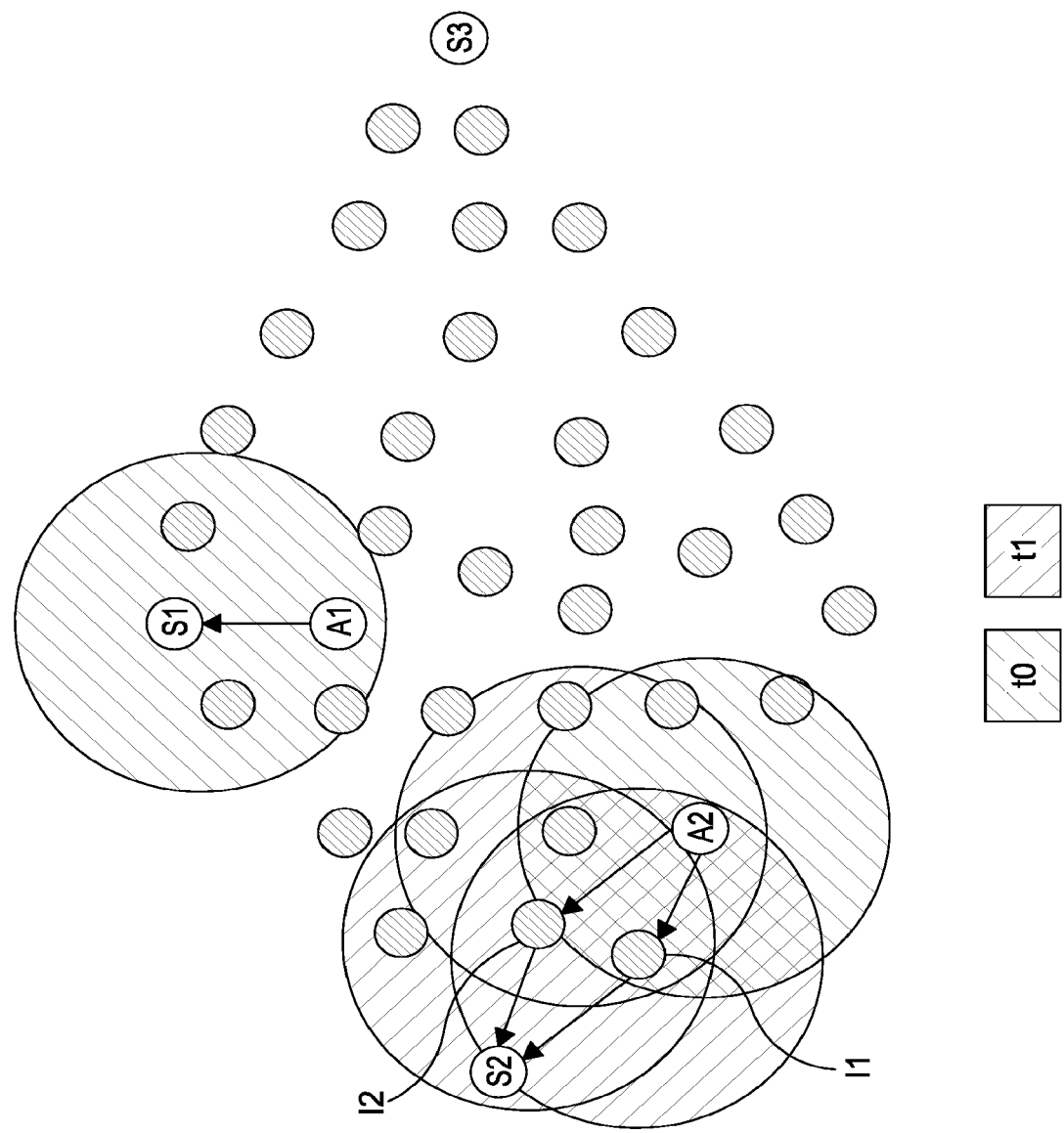
FIG. 4 provides a representation of actuator to sensor communication according to an embodiment.

FIG. 4 shows actuators A1 and A2 echoing back the data packets heard in the previous flood (the first flooding round) from sensors S1 and S2 (as shown in FIG. 3). Not all transmissions are shown for clarity and t0 and t1 refers to two consecutive time slots within this flooding round. Actuator A1 and actuator A2 successfully report back to sensor S1 and sensor S2 respectively due to their spatial proximity to their sources. The communication from actuator A2 to sensor S2 passes through intermediate nodes I1 or intermediate node I2. It will be appreciated that the communication may take other paths and may pass through other intermediate nodes. Sensor S3 may also successfully hear back from the actuators A1 & A2 given enough time as the flood will continue beyond t0 and t1. However, these further steps are not shown.

The communication from actuator A2 to sensor S2 may also benefit from constructive interference and capture effect. The sensor and the synchronizer listen in order to learn the IDs of pairs of sensors and actuators that have successfully communicated. This way, individual sensors can determine if they are able to successfully communicate their changes to all the actuators that they aim to reach. For example, sensors S1 and S2 can determine if they have successfully reached A1 and A2. If so, the sensors can avoid participation in subsequent floods as initiators until there are more changes in their sensor values. This mechanism enables data packets to be transmitted only when needed and also suppresses the number of data sources, which improves the performance of capture effect and thus overall reliability.

FIG. 1 shows different frequency channels (e.g. Ch1 to Ch5) that may be used. Channel diversity is used so as to reduce dependence on a single channel that can be heavily interfered by co-existing technologies such as WiFi etc. A fixed number of channels rotated in a round robin fashion across different time slots may be used or such kind of sequence can be determined by a pseudorandom seed shared across the mesh network.

d) Repetition of Bidirectional Communication between Sensors & Actuators: At step 20, embodiments may repeat the step b) and c) a fixed number of times (referred to as Nf) before finishing the Active phase. The value of Nf can be configured to balance the trade-off between reliability and energy efficiency. A higher value of Nf will result in more reliability and faster communication but more energy consumption and vice versa. In this embodiment, the value of Nf is pre-determined/fixed across the mesh network.

e) Next Active Phase: At the conclusion of an Active phase, there might be some changes in the sensors that might not have yet been reported to the desired actuators. It may be the case that some values might have communicated from sensors to actuators but the reply from actuators to sensors might have been lost in Stage c. Since the Synchronizer has been listening in Stage c, it might have overheard IDs of multiple successful pairs of sensors and actuators. At the start of each Active phase, the Synchronizer is already required to initiate a flood to achieve network-wide synchronization. This flooding round can also be used to send the information about successful receptions at actuators that the Synchronizer has learned in the earlier Active phase.

In step 22, the Synchronizer floods the network again and includes data related to the successful transmission between corresponding sensor and actuator pairs.

Thus, the sensors have yet another opportunity to listen for information about their successful transmissions. This will help them to decide whether they should or should not initiate the flood depending on whether all desired actuators have been reached or not. The data on the successful transmission may be considered to be "piggybacked" on the time synchronization data from the Synchronizer in the flood. This piggybacked information will help the sensors to learn even more to suppress their unnecessary transmissions, thus improving the capture effect.

f) In a final step (not shown in FIG. 2) of the embodiment, there is a loop through stages b, c, d, and e. In this embodiment, the loop is a continuous loop to periodically schedule Active periods, i.e. the loop would not stop. This may be required to continuously run the network i.e., maintain communication between sensors, controller & actuators.

Group Reply Mechanism of Actuators in Active Phase

In stage b, any actuator that has recently received data from the sensor must flood the network in stage c, at least announcing the successful reception destined to it. However, the same actuator might have learned that other sensors and actuators have successfully communicated among themselves. This is because the actuators that have not received their own data in stage b act as receivers in stage c when the other actuators (that have received their data in stage b) are announcing successful receptions. Whenever such actuators receive the data destined to them in stage b, they can also flood data encapsulating successful transmission to them (i.e., their recent reception) as well as data between other corresponding sensor-actuators pairs that they have learned in previous c stages.

Piggybacking

Wireless communication has inherent reliability issues. It is typical that sensors (source nodes) or actuators (destination nodes) are not able to communicate between each other in Stage b and c. However, other nodes such as synchronizer or relay nodes are able to hear the data from them. Embodiments leverage on these opportunities of overhearing to indirectly transmit data between the communicating entities through a piggybacking, aggregating or merging operation. For the remainder of the description, piggybacking, aggregation and merging may be considered as synonyms. Embodiments adopt two mechanisms for piggybacking as described below.

Piggybacking Across Active Phases:

The data source nodes (sensors) are typically required by the applications to periodically report the data to destination nodes (actuators) with a certain frequency which may be defined as the Application Reporting Interval $T_{app}$. In a given $T_{app}$, embodiments may periodically schedule multiple active phases. A value of an Active interval may be chosen such that it is a factor of the $T_{app}$. This means that multiple active phases exist in a single $T_{app}$ interval to transmit the data from source nodes to destination nodes and vice versa. If the synchronizer node hears anything in any of the stages b and c from either source nodes or destination nodes, it piggybacks this information in all the next Active phases belonging to the current $T_{app}$ interval. At the conclusion of a $T_{app}$, the synchronizer node discards the overheard information and starts afresh. At the beginning of next $T_{app}$, all the nodes may get rid of old information and may stop disseminating the information from the previous interval. At the end of $T_{app}$, the source nodes may have new information to send. Therefore, the old information may be outdated. This may be particularly relevant for applications that periodically report data. However, the protocol will work even if applications generate a periodic traffic. In general, when applications have new information to send, the nodes can stop disseminating outdated information.

Piggybacking within Active Phases and Flooding Rounds:

As data is flooded in the network by the synchronizer node, source nodes or destination nodes, data packets traverse different parts of the mesh network. In this process, data packets may transit through the nodes that have their own information which has not yet been delivered to their respective destination nodes. The mechanisms described above require these nodes (sources/destinations) to wait for subsequent flooding rounds (stage b and stage c) or subsequent Active phases before these can transmit their own data. This results in extra communication latency. Embodiments described herein overcome this limitation by allowing the nodes (sources/destinations) to immediately piggyback their own information on the received packet within the same flooding round. A differentiated forwarding scheme is described for this purpose.

Differentiated Forwarding Scheme

Within each flooding round, there are specific time slots for transmission. In any of the flooding rounds in stage a, b and c, if a node has its own information to be sent to other nodes and has just received a data packet, it should prioritize the transmission of this data packet piggybacked with its own information. In order to do so, it should wait a fewer number of slots before transmitting the piggybacked data packet compared to the nodes that heard the data packet in the same time slot and only need to relay exactly the same data packet. The piggybacked data is in the same form as the data that was received. That is, the re-transmitted piggybacked data is delivered in its original form without any losses from sources to destination. Information in the piggybacked data is not lost by merging with other data.

The nodes that do have their own information should wait $S_{piggyback}$ number of slots before forwarding the data packet. The value of $S_{piggyback}$ is chosen randomly from the interval $[0, S\_MAX_{piggyback}]$. However, if a node does not has its own information, it would wait $S_{relay}$ number of slots, the value of which is randomly chosen in an interval $[S\_MAX_{piggyback}+1, S\_MAX_{relay}]$. The value of $S\_MAX_{relay}$ is chosen to be greater than $S\_MAX_{piggyback}$.

Although nodes do not transmit in the randomly chosen number of waiting slots, they do listen to overhear other data packets transmitted by their neighbours. As a result of this listening, if these nodes do overhear information not already scheduled to be piggybacked on their next transmitted packet after waiting $S_{piggyback}$ or $S_{relay}$ number of slots, then the following two actions are taken:

Update the packet to be piggybacked with new information.

Schedule the transmission of the data packet on the earliest time slot among the previously scheduled time slot and new slot computed as current time slot+ random number of waiting slots chosen in the interval $[0, S\_MAX_{piggyback}]+1$.

The maximum thresholds on number of waiting slots ($S\_MAX_{piggyback}$, $S\_MAX_{relay}$) guarantees that data packets are ultimately disseminated over the multiple hops after being received. The assignment of higher priority to the nodes that require their own information be sent to other nodes results in faster dissemination of their traffic (data) within a single flooding round. This approach enables the nodes with more data to speak earlier compared to the others that have less data. This gives priority to the nodes to send their data earlier if they have received more information from sources and also perhaps have their own data to transmit to other destinations.

Figure 5:
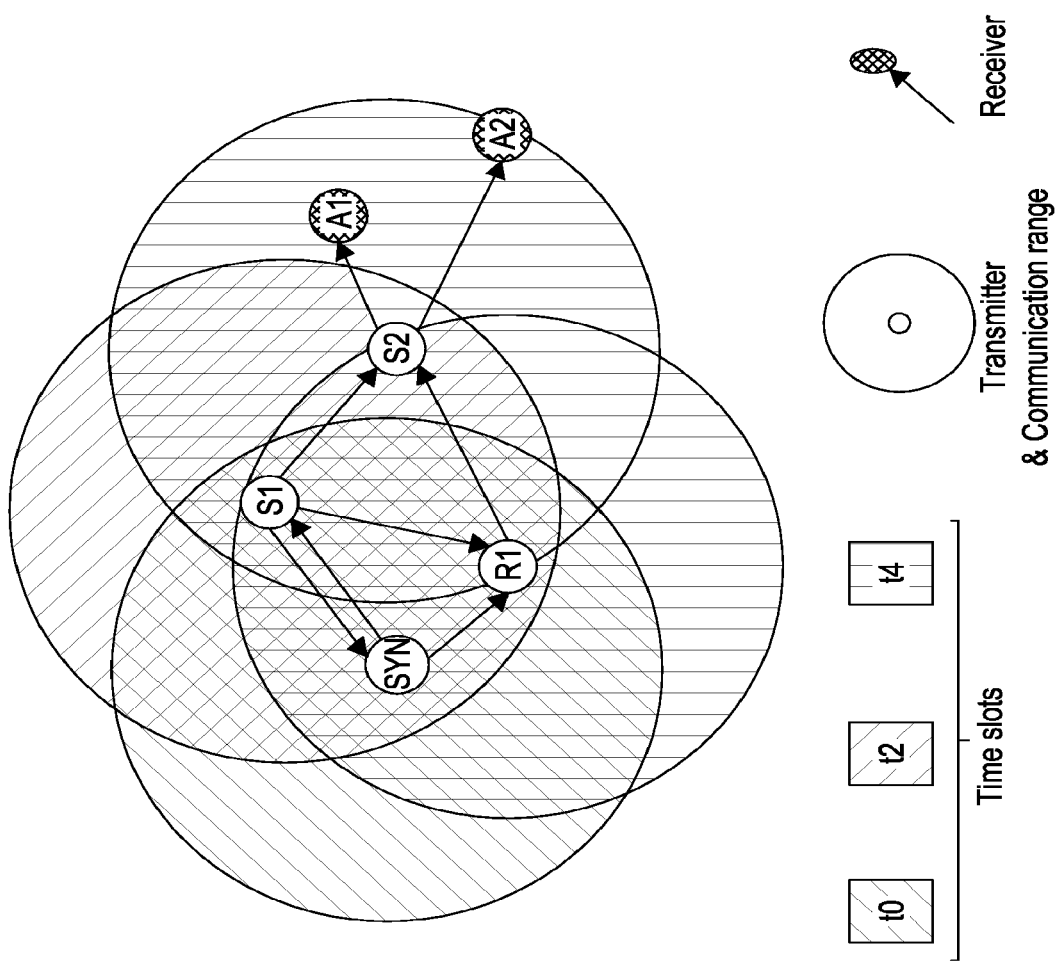
FIG. 5 provides a representation of a differentiated forwarding scheme according to an embodiment.
Figure 6:
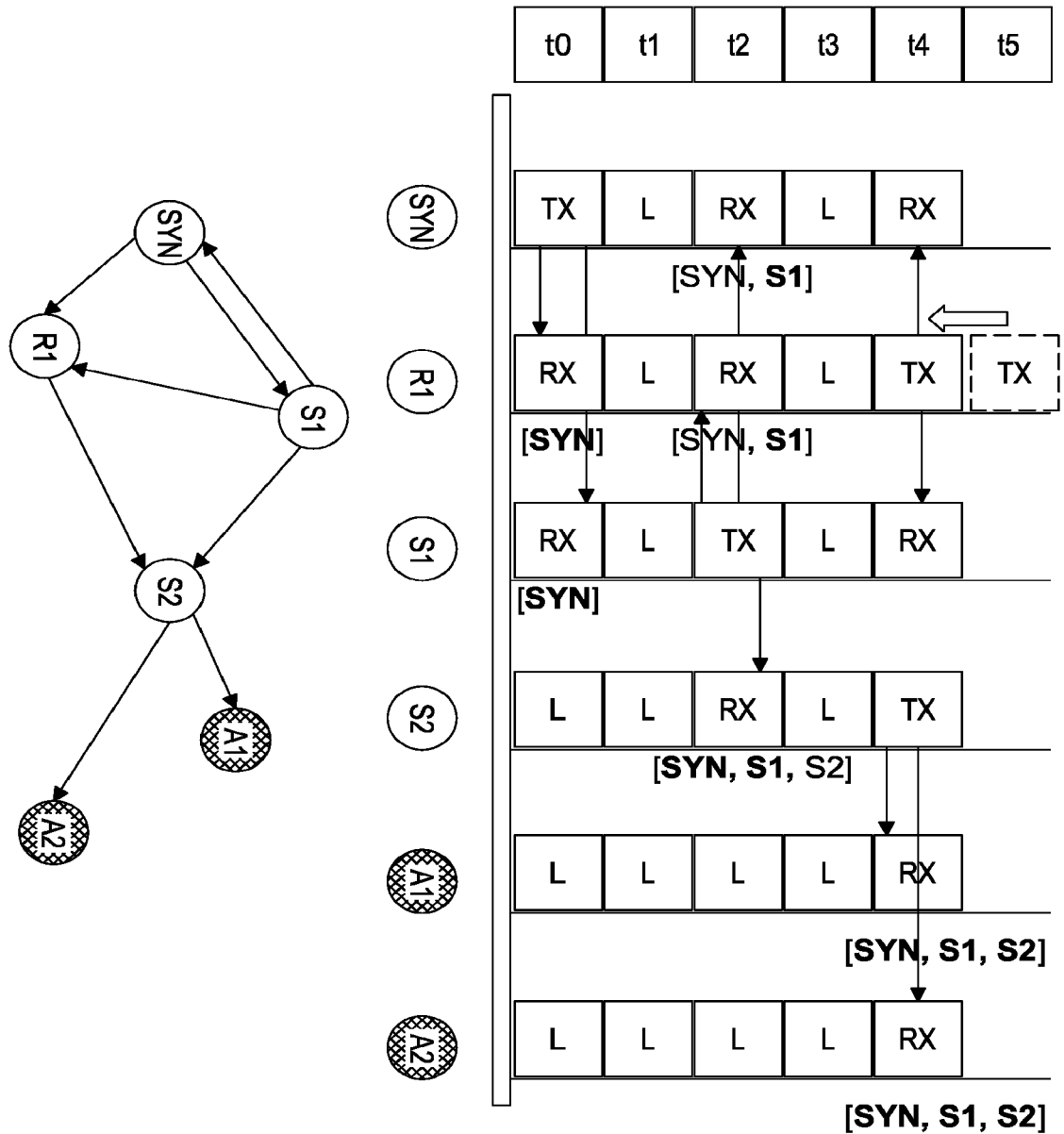
FIG. 6 provides a representation of a slot by slot timeline of the differentiated forwarding scheme of FIG. 5.

FIGS. 5-6 show an example to demonstrate the differentiated forwarding scheme of an embodiment. A synchronizer SYN and two sensor nodes S1 and S2 are trying to send their information to two actuators A1 and A2 in a single flooding round. It can be seen from the transmitter & communication range (the circles surrounding the nodes) that e.g. sensor S1 is not able to transmit directly to either actuator A1 or A2 and the data must be transmitted through sensor S2. The flood is initiated by the synchronizer SYN. In the first time slot t0, synchronizer SYN transmits its own data, which is received by sensor S1 and the relay node R1. As only sensor S1 among the receivers has its own information, it is given a priority over the relay node R1 for transmitting its own data aggregated with the data from synchronizer SYN. Sensor S1 decides the number of waiting slots $S_{piggyback}$ randomly from the interval $[0, S\_MAX_{piggyback}]$, while relay node R1 decides its own number of waiting slots $S_{relay}$ randomly from the interval $[S\_MAX_{piggyback}+1, S\_MAX_{relay}]$. This decision guarantees that the transmission from sensor S1 is scheduled earlier than relay node R1. As an example, $S\_MAX_{piggyback}$ and $S\_MAX_{relay}$ are 3 and 6 respectively.

If $S_{piggyback}$ is chosen to be 1 from the interval [0,3] and $S_{relay}$ is chosen to be 4 from the interval [4,6], then sensor S1 waits and listens in one single slot before transmitting the data packet in slot t2, while relay node R1 schedules four waiting slots (t1, t2, t3, t4) before its transmission in t5. Sensor S1 listens but does not receive in the waiting slot and then transmits a data packet that piggybacks its own data along with the data from synchronizer SYN in t2. This specific data packet is received by the neighbouring listening nodes including synchronizer SYN, relay node R1, and sensor S2, which are listening in t2. As relay node R1 has heard new information that it did not have before (i.e., sensor S1 data), it would update its data packet with this new information for the next scheduled transmission. Then, relay node R1 can possibly move its scheduled transmission slot earlier than t5 if the slot immediately following a random number of waiting slots taken from the interval [0,3] is earlier than t5. Assuming that the random number of waiting slots turns out to be 1, then relay node R1 is required to schedule a waiting slot at t3 and schedule the transmission at t4 instead of t5.

On receiving the data packet from sensor S1 in t2, sensor S2 schedules its next transmission of the data packet containing the received information (data from synchronizer SYN and sensor S1) as well as its own information after waiting a random number of slots chosen from the interval [0,3]. If only 1 waiting slot is to be added by sensor S2, then it schedules its transmission in slot t4. Thus, both sensor S2 and relay node R1 transmit their data packets in slot t4. The data packet from sensor S2 is received by both actuator A1 and actuator A2. This particular data packet not only contains the data transmitted by the synchronizer SYN but also the two sensors S1 and S2. It means that all the data sources (synchronizer SYN, sensor S1, and sensor S2) are able to reach all the destinations in this example. This is different from other systems where only one source is able to transmit to other destinations.

FIG. 6 shows a slot-by-slot timeline of the embodiment shown in FIG. 5. The actuators A1, A2 receive the data from all sources in time slot t4. The blocks labelled TX, RX, and L indicate the radio transmission, reception, and listening states respectively. For example, in timeslot t0, the synchronizer (SYN) transmits data to the relay node R1 and the sensor S1. Therefore, the block corresponding to the synchronizer (SYN) and timeslot t0 is labelled TX. The relay node R1 and the sensor S1 both receive the data in the timeslot t0 and therefore have a block RX. In timeslot t1, both the relay node R1 and the sensor S1 are listening but are not receiving and so have a block with the label L. Actually, all of the other nodes are also listening in t1 as well so each node has the label L in the column t1.

The brackets [ ] enclose the IDs of the sources from which data is received until the given reception slot. For example, in timeslot t0, the relay node R1 and the sensor S1 receives data from the synchronizer (SYN) and so in both of the corresponding locations there is a label [SYN]. New received information in exactly the given reception slot is shown in bold and old information (i.e. not just received) is not in bold. In timeslot t0, the data from the synchronizer (SYN) has just been received by the relay node R1 and the sensor S1 and so it is new information and has a label in bold, i.e. [SYN]. Whereas in timeslot t2, the information held by relay node R1 from the synchronizer (SYN) is old and the information from the sensor S1 is newly received. Thus, the label in the brackets for relay node R1 in t2 is [SYN, S1]. In addition, the relay node R1 is still receiving in t2 and so again has a block labelled RX.

The block enclosed in the dashed line is the transmission slot that was initially scheduled but later cancelled to reschedule transmission earlier as a result of receiving a new data packet in the waiting slots. More particularly, relay node R1 was originally scheduled to transmit in timeslot t5 and had thus the block was labelled TX. However, due to the relay node R1 hearing new information that it did not have before (i.e., sensor S1 data in timeslot t2) the relay node R1 moved its scheduled transmission slot earlier than t5, i.e. to t4. Thus, in timeslot t4, the relay node R1 has a block with a label TX.

Figure 7:
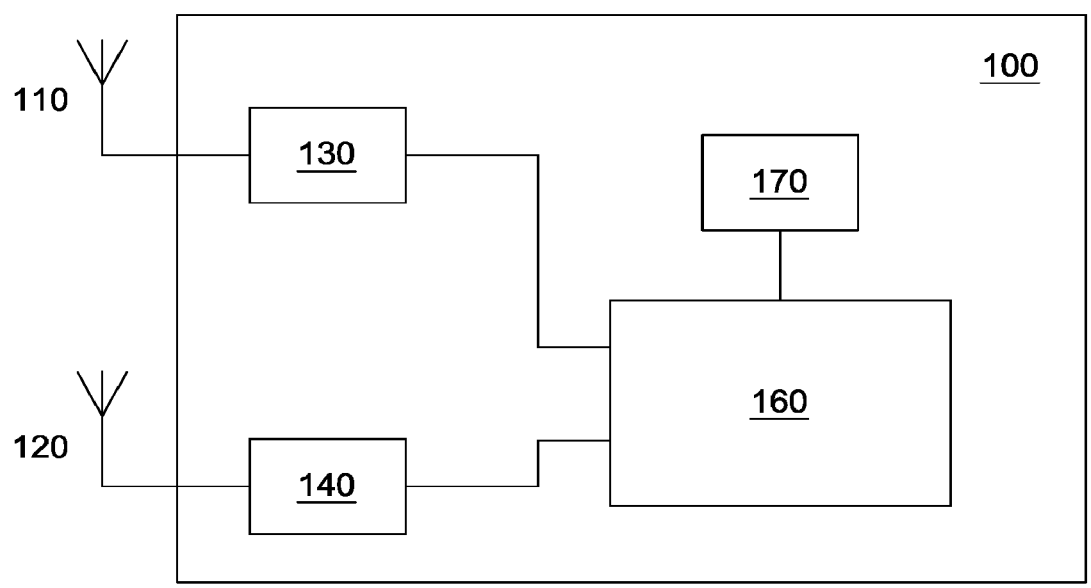
FIG. 7 illustrates a node according to an embodiment.

FIG. 7 shows a node 100 according to an embodiment. The node comprises a transmit 110 and a receive 120 antenna or a combined antenna used for both transmission and reception, a transmit chain 130 and a receive chain 140. The node moreover comprises a controller 160 and non-volatile memory 170. The controller 160 is configured to access computer program instructions stored in the memory 170 and to execute the methods described herein on the basis of these instructions.

The mesh network is made up of a plurality of nodes 100. The plurality of nodes 100 may be source nodes, destination nodes or relay nodes as described above. One or more of the plurality of nodes 100 in the network may be intermediate nodes which are configured to re-transmit received data in the form it was received as described above. The source nodes, destination nodes and relay nodes may be considered to be intermediate nodes if they are receiving and transmitting data for another intended destination.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A system, comprising:
 first communication apparatuses corresponding to source nodes;
 second communication apparatuses corresponding to destination nodes; and
 a third communication apparatus corresponding to an intermediate node, wherein
 the first communication apparatuses are configured to transmit data concurrently in a first flooding round including time slots to corresponding second communication apparatuses;
 the corresponding second communication apparatuses are configured to receive data from corresponding first communication apparatuses; and
 the third communication apparatus is configured to:
  receive first data from at least one of the first communication apparatuses according to a first communication scheme, wherein the first data is to be transmitted by the third communication apparatus to at least one of the second communication apparatuses,
  determine whether the third communication apparatus has second data to be transmitted, wherein the second data is generated by the third communication apparatus independently of and not based on the received first data;

transmit the first data during a first time slot of the first flooding round according to the first communication scheme after waiting a first number of waiting slots after receiving the first data, when it is determined that the third communication apparatus does not have the second data, and transmit both the first data and the second data during a second time slot earlier than the first time slot of the first flooding round according to the first communication scheme after waiting a second number of waiting slots after receiving the first data, when it is determined that the third communication apparatus has the second data, the second number of waiting slots being selected to be fewer than the first number of waiting slots.

2. The system as claimed in claim 1, wherein the at least one of the second communication apparatuses is further configured to transmit a signal concurrently with at least one of other second communication apparatuses in a second flooding round when the data has been received from a corresponding one of the first communication apparatuses, the signal indicating that the data from the corresponding one of the first communication apparatuses has been received successfully.

3. The system as claimed in claim 2, wherein the at least one of the first communication apparatuses is further configured to repeat the first flooding round at least once; and
the at least one of the second communication apparatuses is further configured to repeat the second flooding round at least once.

4. The system as claimed in claim 2, wherein the at least one of the first communication apparatuses is further configured to:
receive the signal from the corresponding one of the second communication apparatuses,
determine that the data has been received by the corresponding one of the second communication apparatuses, and
cease transmission of the data.

5. The system as claimed in claim 2, wherein the at least one of the second communication apparatuses is further configured to:
receive the signal from another of the second communication apparatuses indicating that data has been successfully received,
receive data from the corresponding one of the first communication apparatuses of the at least one of the second communication apparatuses, and
transmit a further signal indicating that data intended for the at least one of the second communication apparatuses has been successfully received and the information that data has been successfully received by the another of the second communication apparatuses.

6. The system as claimed in claim 1, wherein the at least one of the first communication apparatuses is further configured to transmit the data on a single channel or on a plurality of channels.

7. The system as claimed in claim 1, further comprising a fourth communication apparatus corresponding to a synchronizer node, wherein the fourth communication apparatus is configured to flood a network in a synchronization flooding round such that the first communication apparatuses, the second communication apparatuses, and the third communication apparatus are time synchronized.

8. The system as claimed in claim 7, wherein the fourth communication apparatus is further configured to include information regarding successful transmission between source nodes and their corresponding destination nodes in the synchronization flooding round.

9. The system as claimed in claim 1, wherein the at least one of the first communication apparatuses is further configured to determine if the data is to be transmitted based upon whether the data has been generated at the at least one of the first communication apparatuses, and transmit the data in the first flooding round concurrently with other first communication apparatuses which have generated data.

10. The system as claimed in claim 1, wherein the at least one of the second communication apparatuses is further configured to process data which has the strongest signal when received.

11. The system as claimed in claim 1, wherein the at least one third communication apparatus is at least one of a source node that generates data, a destination node that consumes data, and a relay node that does not generate or consume data.

12. The system as claimed in claim 1, wherein the third communication apparatus is further configured to:
select the second number of waiting slots $S_{piggyback}$ from an interval $[0, S\_MAX_{piggyback}]$ when the first data is received and the third communication apparatus has the second data, and
select the first number of waiting slots $S_{replay}$ from an interval $[S\_MAX_{piggyback}+1, S\_MAX_{relay}]$ when the first data is received and the third communication apparatus does not have the second data.

13. The system as claimed in claim 12, wherein the third communication apparatus is further configured to:
determine a number of waiting slots $S\_NEW_{piggyback}$ from the interval $[0, S\_MAX_{piggyback}]$ when further data is received, and
schedule an updated time slat as the earlier of the first time slot and a current time slot+ the waiting slot $S\_NEW_{piggyback}+1$.

14. The system as claimed in claim 1, wherein the system is a wireless sensor and/or actuator network or a cyber physical system.

15. The system of claim 1, wherein the third communication apparatus is further configured to generate the second data prior to receiving the first data.

16. A communication apparatus, comprising:
circuitry configured to:
receive first data from at least one of a plurality of source nodes in a first flooding round according to a first communication scheme, wherein the first data is to be transmitted by the communication apparatus to at least one of a plurality of destination nodes;
determine whether the communication apparatus has second data to be transmitted, wherein the second data is generated by the communication apparatus independently of and not based on the received first data;
transmit the first data during a first time slot of the first flooding round according to the first communication scheme after waiting a first number of waiting slots after receiving the first data, when it is determined that the communication apparatus does not have the second data; and
transmit both the first data and the second data during a second time slot earlier than the first time slot of the first flooding round according to the first communication scheme after waiting a second number of waiting slots after receiving the first data, when it is determined that the communication apparatus has the second data, the second number of waiting slots being selected to be fewer than the first number of waiting slots.

17. A method of data transmission in a system comprising first communication apparatuses corresponding to source nodes, second communication apparatuses corresponding to destination nodes, and at least one third communication apparatus corresponding to an intermediate node, the method comprising:
  transmitting data concurrently in a first flooding round from the first communication apparatuses to corresponding second communication apparatuses;
  receiving data at the second communication apparatuses from corresponding first communication apparatuses;
  receiving first data at the third communication apparatus from at least one of the first communication apparatuses according to a first communication scheme, wherein the first data is to be transmitted by the third communication apparatus to at least one of the second communication apparatuses;
  determining whether the third communication apparatus has second data to be transmitted at the third communication apparatus, wherein the second data is generated by the third communication apparatus independently of and not based on the received first data;
  transmitting the first data from the third communication apparatus during a first time slot of the first flooding round according to the first communication scheme after waiting a first number of waiting slots after receiving the first data, when it is determined that the third communication apparatus does not have the second data; and
  transmitting both the first data and the second data from the third communication apparatus during a second time slot earlier than the first time slot of the first flooding round according to the first communication scheme after waiting a second number of waiting slots after receiving the first data, when it is determined that the third communication apparatus has the second data, the second number of waiting slots being selected to be fewer than the first number of waiting slots.

18. A method performed by a communication apparatus, the method comprising:
  receiving first data from at least one of a plurality of source nodes in a first flooding round according to a first communication scheme, wherein the first data is to be transmitted by the communication apparatus to at least one of a plurality of destination nodes;
  determining whether the communication apparatus has second data to be transmitted, wherein the second data is generated by the communication apparatus independently of and not based on the received first data;
  transmitting the first data during a first time slot of the first flooding round according to the first communication scheme after waiting a first number of waiting slots after receiving the first data, when it is determined that the communication apparatus does not have the second data; and
  transmitting both the first data and the second data during a second time slot earlier than the first time slot of the first flooding round according to the first communication scheme after waiting a second number of waiting slots after receiving the first data, when it is determined that the communication apparatus has the second data, the second number of waiting slots being selected to be fewer than the first number of waiting slots.

* * * * *